United States Patent
Wen (10) Patent No.: US 7,509,229 B1
(45) Date of Patent: *Mar. 24, 2009

(54) BAYESIAN APPROACH TO CORRELATING NETWORK TRAFFIC CONGESTION TO PERFORMANCE METRICS

(75) Inventor: Han C. Wen, San Jose, CA (US)

(73) Assignee: OPNET Technologies, Inc., Bethesda, MD (US)

( * ) Notice: Subject to any disclaimer, the term of this patent is extended or adjusted under 35 U.S.C. 154(b) by 681 days.

This patent is subject to a terminal disclaimer.

(21) Appl. No.: 10/205,135

(22) Filed: Jul. 23, 2002

(51) Int. Cl.
 *G06F 17/18* (2006.01)
 *G06F 19/00* (2006.01)
 *G06F 15/00* (2006.01)
(52) U.S. Cl. .......................... 702/179; 714/47; 725/96; 370/229; 709/223
(58) Field of Classification Search ................. 702/181, 702/182, 185, 19, 179, 190; 709/223–224; 358/3.08; 714/47; 370/229; 725/96
See application file for complete search history.

(56) References Cited

U.S. PATENT DOCUMENTS

| | | | |
|---|---|---|---|
| 5,706,436 A | 1/1998 | Lewis et al. | |
| 6,597,777 B1 | 7/2003 | Ho | |
| 6,735,192 B1 | 5/2004 | Fried et al. | |
| 6,744,757 B1 | 6/2004 | Anandakumar et al. | |
| 6,836,800 B1 * | 12/2004 | Sweet et al. | 709/224 |
| 6,928,472 B1 | 8/2005 | Wen | |
| 7,000,025 B1 | 2/2006 | Wilson | |
| 7,072,305 B1 | 7/2006 | Gregson | |
| 7,337,206 B1 | 2/2008 | Wen et al. | |
| 2002/0004827 A1 | 1/2002 | Ciscon et al. | |
| 2002/0099818 A1 | 7/2002 | Russell et al. | |
| 2002/0161914 A1 | 10/2002 | Belenki | |
| 2003/0023385 A1 * | 1/2003 | Lazaridis | 702/19 |
| 2003/0172094 A1 | 9/2003 | Lauria et al. | |
| 2005/0165556 A1 * | 7/2005 | Barnhill et al. | 702/19 |

OTHER PUBLICATIONS

Morris et al., 'Space Shuttle RTOS Bayesian Network', Oct. 2001, IEEE Publication, vol. 1, pp. 1-13.*
Westland, 'Bayesian Alternatives to Neural Computing', Jan. 1995, IEEE Publication, vol. 25, No. 1, pp. 59-67.*
Sanchez-Ubeda et al., 'Application of Data Mining Techniques to Identify Structural Congestion Problems under Uncertaintiy', 2001, IEEE Publication, pp. 1-6.*

(Continued)

*Primary Examiner*—Edward Raymond
*Assistant Examiner*—Elias Desta
(74) *Attorney, Agent, or Firm*—Robert M. McDermott (57) ABSTRACT

For each of a number of network performance metrics, an associated value $r_{pm}$ that represents a difference between a first correlation coefficient $r_1$ computed for a baseline data set and a second correlation coefficient $r_2$ computed for a second data set that includes the baseline data set and other data points classified as duration outliers is computed. The first and second correlation coefficients for each network performance metric represent correlation between that network performance metric and durations of network connections. The network performance metric that has a largest associated $r_{pm}$ value of all statistically significant $r_{pm}$ values computed is selected as representing the probable root cause of the duration outliers. Statistical significance is measured through comparison of an $r_{pm}$ value with a statistical property of a set of Bayesian correlation coefficients computed for each performance metric.

12 Claims, 4 Drawing Sheets

OTHER PUBLICATIONS

Jacobson et al., 'Congestion Avoidance and Control', Nov. 1988, UCB Publication, pp. 1-25.*

Floyd Bullard, "A Brief Introduction to Bayesian Statistics", pp. 1-14, NCTM 2001.

Tianhang Hou, Lloyd C. Huff, and Larry Mayer, "Automatic Detection of Outliers in Multibeam Echo Sounding Data", University of New Hampshire, pp. 1-12.

Igor V. Cadez and P.S. Bradley, "Model BAsed Population Tracking and Automatic Detection of Distribution Changes" pp. 1-8.

Edwin M. Knorr and Raymond T. Ng, "A Unified Approach for Mining Outliers", Universityof British Columbia, pp. 1-13.

Mark Last and Abraham Kandel, Automated Detection of Outliers in Real-World Data, pp. 1-10.

Dantong Yu, Gholam Sheikholeslami and Aidong Zhang, "Find Out: Finding Outliers in Very Large Datasets", University of New York at Buffalo, pp. 1-19.

Hiroyuki Ohsaki, Mitsushige Morita and Masayuki Murata, "Measurement-Based Modeling of Internet Round-Trip Time Dynamics using System Identification", pp. 1-20.

Polly Huang, Anja Feldmann and Walter Willinger, "A non-intrusive, wavelet-based approach to detecting network performance problems", pp. 1-15.

Matthew Mathis, Jeffrey Semke and Jamshid Mahdavi, "The Macroscopic Behavior of the TCP Congestion Avoidance Algorithm", ACM SIGCOMM, vol. 27, No. 3, (Jul. 1997), pp. 1-16.

Nevil Brownlee and Chris Loosley, "Fundamentals of Internet Measurement: A Tutorial" Keynote, (May 1, 2001) pp. 1-14.

M. Mathis and M. Allman, "A Framework for Defining Empirical Bulk Transfer Capcity Metrics", (Jul. 2001), pp. 1-16.

G. Almes, S. Kalidindi and M. Zekauskas, "A Round-Trip Delay Metric for IPPM", Internet Society (Sep. 1999), pp. 1-20.

G. Almes, S. Kalidindi and M. Zekauskas, "A One-Way Packet Loss Metric for IPPM", Internet Society (Sep. 1999), pp. 1-15.

G. Almes, S. Kalidindi and M. Zekauskas, "A One-Way Delay Metric for IPPM", Internet Society (Sep. 1999), pp. 1-20.

J. Mahdavi and V. Paxson, "IPPM Metrics for Measuring Connectivity", Internet Society, (Sep. 1999), pp. 1-10.

V. Paxson et al., "Framework for IP Performance Metrics" Internet Society, (May 1998), pp. 1-40.

Vern Paxson, "End-to-End Routing Behavior in the Internet", University of California, (May 23, 1996), pp. 1-23.

SWDIV and EFAWEST, "Handbook for Statistical Analysis of Environmental Background Data", Naval Facilities Engineering Command, (Jul. 1999), pp. 1-83.

Surendra P. Verma, "Sixteen Statistical Tests for Outlier Detection and Rejection in Evaluation of International Geochemical Reference Materials: Example of Microgabbro PM-S", Geostandards Newsletter, vol. 21 No. 1, (Sep. 26, 1996) pp. 59-75.

Kenneth C. Glossbrenner, Approved Text for new Recommendation I.380: "Internet Protocol Data Communication Service—IP Packet Transfer and Availability Performance Parameters", AT&T, (May 3, 1999), pp. 1-28.

V. Rais, G. Grote and A. Mo, "Network Performance measurement With Periodic Streams", AT&T, pp. 1-31.

Rajeev K and R. Ravi, "One-Way Loss Pattern Sample Metrics Draft-ietf-ippm-loss-pattern-07.txt", IPPM Working Group, (Mar. 28, 2002), pp. 1-23.

C. Demic and P. Chi, "IP Packet Delay Variation Metric for IPPM", Network Working Group, (2002), pp. 1-31.

Vern Paxson and Sally Floyd, "Why We Don't Know How to Simulate the Internet", University of California, (Dec. 1997), pp. 1-8.

Edwin M. Knorr and Raymond T. Ng, "Algorithms for Mining Distance-Based Outliers in Large Datasets", University of British Columbia, (1998), pp. 1-12.

Vern Paxson, Measurements and Analysis of End-to-End Internet Dynamics, University of California, (Apr. 1997), pp. 1-392.

* cited by examiner

BAYESIAN APPROACH TO CORRELATING NETWORK TRAFFIC CONGESTION TO PERFORMANCE METRICS

FIELD OF THE INVENTION

The present invention relates to a method for determining the cause of congestion in computer networks based on correlations between measured performance metrics and network connection durations.

BACKGROUND

Many communication networks, such as the Internet, rely on packet switching technologies (e.g., X.25, frame relay, asynchronous transfer mode, etc.) to transport variable or uniform blocks (usually termed packets or cells) of data between nodes. The term packet will be used herein to collectively refer to any such block of information. In essence, a packet switched network is a network of queues communicatively coupled together by communication links (which may be made up of various physical media). At each network node (e.g., a switch or router), there exist one or more queues of packets for each outgoing link. If the rate at which packets arrive and queue up exceeds the rate at which packets are transmitted, queue size grows without bound and the delay experienced by a packet tends towards infinity.

In an ideal case, network throughput, and hence network use, should increase to an offered load up to the physical capacity of the network and remain at capacity if the load is further increased. This ideal case, however, requires that all nodes somehow know the timing and rate of packets that will be presented to the network with no overload and no delay in acquiring this information; a situation which is not possible. If no control is exercised, as the load increases, use increases for a while. Then, as the queue lengths at various nodes begin to grow, throughput actually drops. This is due, in part, to the retransmission of dropped packets, and it is common for this condition to be described as "congestion". It is clear that catastrophic network failures due to congestion should (indeed, must) be avoided and preventing such failures is the task of congestion control processes within packet switched networks. As a starting point for such processes, however, one must be able to determine when and where congestion is occurring.

Any attempt to measure congestion (which for purposes of this discussion shall be regarded more formally as anomalous deviations in the end-to-end response time or duration of a connection) necessarily requires the gathering of some network performance information. This raw information may relate to a variety of network "metrics" as defined by the Internet Engineering Task Force (IETF) in a series of Requests for Comments (RFCs) as follows:

a. RFC 2330, entitled "Framework for IP Performance Metrics" (May 1998), define a general framework for particular metrics to be developed by the IETF's IP Performance Metrics effort, begun by the Benchmarking Methodology Working Group (BMWG) of the Operational Requirements Area, and being continued by the IP Performance Metrics Working Group (IPPM) of the Transport Area.

b. RFC 2678, entitled "IPPM Metrics for Measuring Connectivity" (September 1999), defines a series of metrics for connectivity between a pair of Internet hosts. It builds on notions introduced and discussed in RFC 2330, the IPPM framework document.

c. RFC 2679, entitled A One-way Delay Metric for IPPM" (September 1999), defines a metric for one-way delay of packets across Internet paths.

d. RFC 2680, entitled "A One-way Packet Loss Metric for IPPM" (September 1999), defines a metric for one-way packet loss across Internet paths.

e. RFC 2681, entitled "A Round-trip Delay Metric for IPPM" (September 1999), defines a metric for round-trip delay of packets across Internet paths.

f. A draft RFC entitled "IP Packet Delay Variation Metric for IPPM" (April 2002) refers to a metric for variation in delay of packets across Internet paths. The metric is based on the difference in the One-Way-Delay of selected packets. This difference in delay is called "IP Packet Delay Variation".

g. A draft RFC entitled "One-Way Loss Pattern Sample Metrics" (March 2002) uses the base loss metric defined in RFC 2680 to define two derived metrics, "loss distance" and "loss period", and the associated statistics that together capture loss patterns experienced by packet streams on the Internet. The authors postulate that the loss pattern or loss distribution is a key parameter that determines the performance observed by the users for certain real-time applications such as packet voice and video. For the same loss rate, two different loss distributions could potentially produce widely different perceptions of performance.

h. A draft RFC entitled "Network Performance Measurement with Periodic Streams" (April 2002) describes a periodic sampling method and relevant metrics for assessing the performance of IP networks.

Regardless of the metric of used, however, the volume of data obtained from any real world network generally requires that the data be analyzed using statistical tools in order to arrive at conclusions about the network's performance. However, this can lead to unsatisfactory results. For example, one may wish to consider duration outliers as evidence of congestion episodes (see, e.g., the discussion in U.S. patent application Ser. No. 10/195,904, entitled "Method for Detecting Congestion in Internet Traffic", filed Jul. 15, 2002, incorporated herein by reference and assigned to the same assignee as the present application). Outliers are generally regarded as observations that deviate so much from other observations of the same dataset as to arouse suspicions that they were generated by a different mechanism. See, e.g., Edwin M. Knorr and Raymond T. Ng., "Algorithms for Mining Distance-Based Outliers in Large Datasets", Proc. $24^{th}$ VLDB Conf. (New York 1998).

Difficulties arise in correlating duration outliers to performance metrics such as round trip time (RTT) because these two variables are naturally correlated, irrespective of any outliers. Therefore, the correlation between these variables, as measured by the value of the correlation coefficient (r), is not a reliable indicator of the correlation between duration outliers (which tend to indicate congestion) and that metric. Thus, a new approach is needed.

SUMMARY OF THE INVENTION

The probable cause of congestion within a network is determined by computing correlation coefficients for each of a number of performance metrics for a network and connection duration within the network. Two correlation coefficients are computed for each metric, one using a baseline data set and the other using a data set that includes the baseline plus other data points classified as duration outliers. For each performance metric, a difference ($r_{pm}$) between the two correlation coefficients is determined.

These $r_{pm}$ values are tested for statistical significance, and as a result, some of the performance metrics and their associated $r_{pm}$ values may be excluded from further consideration. Of the retained performance metrics, that one having the highest $r_{pm}$ value is identified as being the probable cause of congestion within the network.

The statistical significance of a performance metric's $r_{pm}$ value is evaluated by comparing that $r_{pm}$ value to a statistical property of a set of Bayesian correlation coefficients computed for the associated performance metric and connection duration. Each of the Bayesian correlation coefficients is computed by selecting M random data points from the baseline data set for the associated performance metric (M being equal to the number of data points classified as duration outliers) adding the selected M random data points to the baseline to produce a Bayesian data set for the associated performance metric, and computing a correlation coefficient for the associated performance metric and duration using that Bayesian data set. Once a statistically significant number of these Bayesian correlation coefficients has been developed, statistical properties such as standard deviation or root mean square deviation of the Bayesian correlation coefficients may be computed and compared to the $r_{pm}$ value of the associated performance metric. The $r_{pm}$ value is deemed statistically significant if it compares favorably to the statistical property of the Bayesian correlation coefficient.

BRIEF DESCRIPTION OF THE DRAWINGS

The present invention is illustrated by way of example, and not limitation, in the accompanying figures, in which.

DETAILED DESCRIPTION

Described below is a method for correlating a congestion episode to performance metrics in Internet traffic. Congestion in this context is defined as anomalous deviations in the end-to-end response time or duration of a connection. These anomalies are referred to as duration outliers, for which the average duration over a given time interval exceeds a threshold value. When one or more contiguous time intervals are each characterized by duration outliers, then the total interval time will be referred to as a congestion episode.

The present invention makes use of a Bayesian method for determining statistical uncertainty in various computations. Bayesian methods are an example of inferential statistical analysis; a branch of statistics that attempts to make valid predictions based on only a sample of all possible observations. Classical inferential models do not permit the introduction of prior knowledge into such calculations, even if this knowledge might be useful in coming to a conclusion. Bayes' Theorem, on the other hand, allows for the use of such prior knowledge. The present invention applies this technique in the evaluation of certain correlation coefficients involving various network performance metrics. The examples of the various performance metrics that may be used in determining the cause of congestion episodes that are set forth in this discussion, however, are not meant to be restrictive. Thus, the true measure of the present invention should not be restricted to the examples set forth below, but rather should be consistent with the scope of the claims which follow this discussion.

In determining whether or not congestion exists in a network (be it the Internet or another network) it is useful to consider the "duration" of a connection, measured as the total end-to-end response time of a connection. Congestion will be deemed to exist if duration outliers are observed in a study of a duration time series. There are many statistical tests that have been developed to identify outliers for a given variable; for example, Grubb's Test, Rosner's Test and Walsh's Test. In the above-cited U.S. patent application, a new method for determining duration outliers is proposed that, unlike conventional outlier tests, makes use of information from multiple performance metrics.

Regardless of the method used to detect outliers, however, it is necessary to collect data from the network under evaluation. Duration and other performance metric data (e.g., connection payload or file size, server response time, packet loss rate, and latency or round-trip time (RTT)) can be gathered in a variety of ways. For example, when installed in a network the NP-1000 Internet Traffic Manager™ produced by Network Physics, Inc. of Mountain View, Calif., the assignee of the present invention, is capable of monitoring and recording a wide range of network metrics, which can be displayed via tables, charts, and topological diagrams for all traffic through the NP-1000, or for user-specified groups of servers, autonomous systems, or clients. The data can be resolved to various granularities for various time periods.

Once duration data (e.g., for one or a group of specified clients, routes, servers, networks, or any other category of choice) has been collected, it can be analyzed to determine if congestion episodes are present. As indicated above, this determination is made by looking for outliers in the duration data. Durations that exceed established norms are categorized as outliers and the associated clients, routes, etc. are identified as experiencing congestion.

Although this process will identify the existence of congestion episodes, the question remains as to what the root cause of the congestion is. The present method may be used to uncover the likely root cause of the anomalous durations (i.e., the outliers) in order to provide network operators and others with greater understanding of the true network conditions. The method involves using a change in correlation coefficient (as calculated between selected performance metrics and the duration data) as a measure of the correlation between duration outliers and a given performance metric.

The change in correlation coefficient is defined as the difference between coefficients calculated between duration and a performance metric for two data sets. The first data set is a baseline, consisting of all the intervals that do not have duration outliers. The second data set consists of the same baseline data plus all time intervals with duration outliers associated with the current congestion episode. An increase in correlation coefficient from the first data set to the second data set indicates that the addition of the duration outliers introduces a stronger correlation to the performance metric under consideration beyond that which exists between duration and the performance metric irrespective of any congestion.

Before applying this process, however, it is preferable to test whether or not the correlation between a performance metric and congestion (as measured by the presence of duration anomalies) is simply due to statistical fluctuations in the data. If so, that performance metric should be excluded from further consideration. Then for the remaining performance metrics, the above procedure is applied and the performance metric that is associated with the largest increase in correlation coefficient is identified as the most probably root cause of the anomalous durations. That is, it is deemed to be the performance metric most likely associated with the congestion episode.

Figure 1:
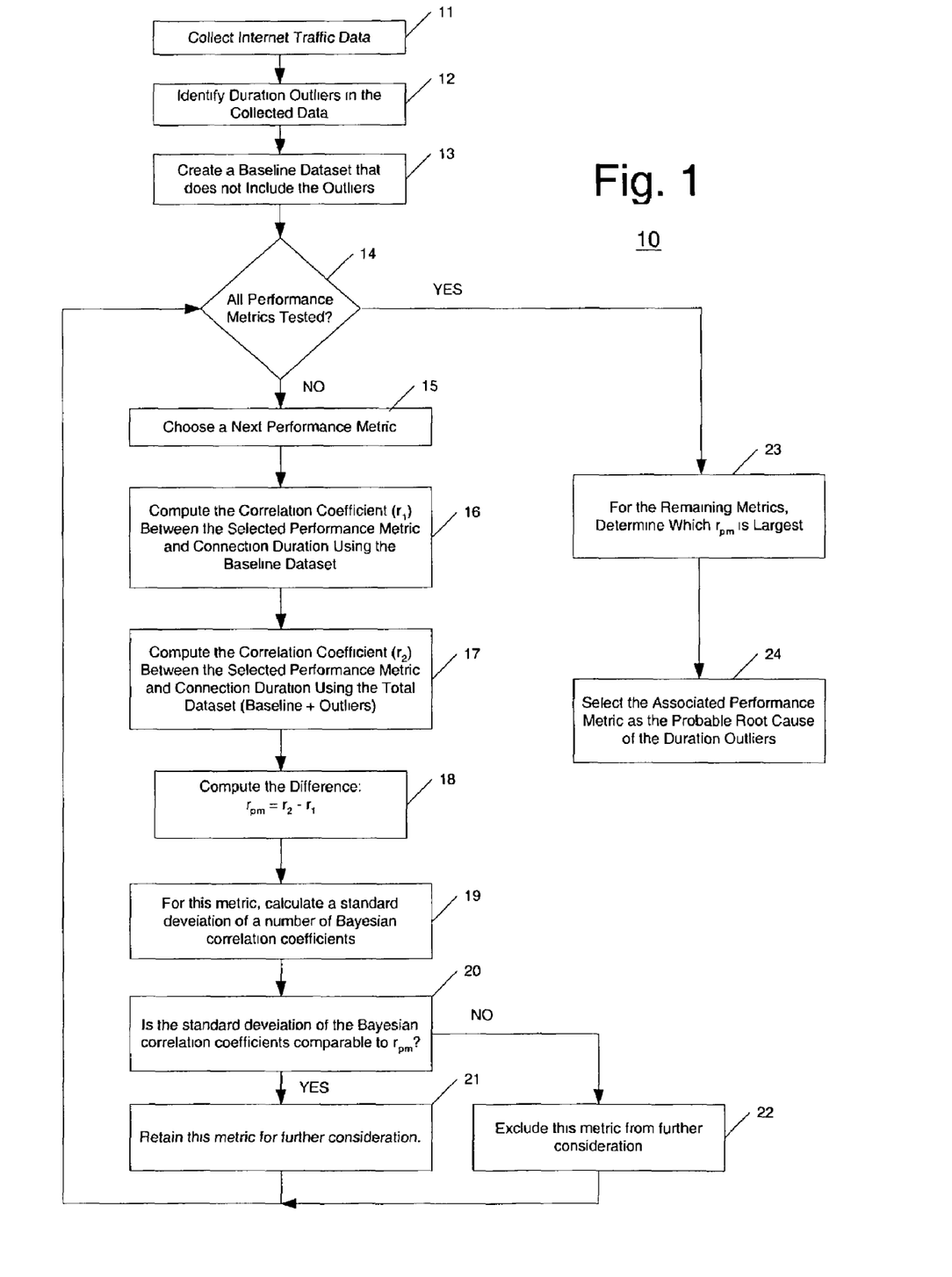
FIG. 1 illustrates an example of a process for determining which of a number of performance metrics is a probable cause of duration outliers in network traffic in accordance with the present invention.

FIG. 1 illustrates an example of a procedure 10 for determining which performance metric is the probable root cause of congestion within a network in accordance with the present invention. At step 11, the Internet traffic data is collected. As indicated above, the NP-1000 may be used to collect the data or other appropriate instruments may be used for this purpose. In addition to collecting data regarding connection duration, data regarding as many performance metrics as desired can also be collected. In particular, data regarding RTT, server response time, file size and/or packet loss may be collected.

Once the traffic data has been collected, duration outliers are identified at step 12. As indicated above, the identification of these outliers may be performed using conventional statistical tests or, preferably, using the methods described in the above-cited U.S. patent application. Once the outliers are identified, a baseline data set that excludes time intervals containing these outliers can be established at step 13. The original data set that includes the outliers is also retained for further use as discussed below.

Once the two datasets have been established, a process for determining changes in correlation coefficients associated with each performance metric begins at step 14. That is, for each performance metric of interest (step 15), two correlation coefficients are computed. The first (computed at step 16) measures the correlation between the performance metric under test and duration using the baseline dataset that does not include the time intervals for the duration outliers. This produces a correlation coefficient $r_1$. The second (computed at step 17) measures the correlation between the performance metric under test and duration using the dataset that does include the time intervals for the duration outliers. This produces a correlation coefficient $r_2$. Note that it does not matter in which order $r_1$ and $r_2$ are computed and in some embodiments these values may be computed in parallel.

Once the two correlation coefficients have been computed, the difference in those values, $r_{pm}=r_2-r_1$ is computed at step 18. The value $r_{pm}$ represents the change in correlation coefficient for the performance metric (pm) under test. If $r_{pm}$ is positive, this indicates a stronger correlation between the performance metric under test and duration than that which exists irrespective of any congestion.

By way of example, consider a case where the performance metric of interest is RTT. Suppose duration and RTT data for Internet traffic was collected over a period of time and a baseline dataset determined therefrom. Excluded from the baseline dataset were five data points representing what were determined to be duration outliers.

Continuing our example, using the above method a baseline correlation coefficient was determined to be 0.4. Then, when the five data points associated with the outliers were added to the baseline, a resulting correlation coefficient for the second data set was found to be 0.9. This represents an increase of 0.5. This sort of calculation does, however, lead to the question of identifying the significance in any increase in correlation coefficient. That is, was the increase of 0.5 in the above example really due to the outliers, or could it be due to natural fluctuations in the data? In order to answer this question, the present method makes use of the principles underlying Bayes Theorem in determining the statistical significance of changes in correlation coefficients as computed above.

Stating the problem more succinctly, let the number of time intervals of duration outliers for a current congestion episode be M and the number of baseline time intervals for duration data without outliers be N. For each of these time intervals there exists a measurement of duration and of the metric of interest (e.g., RTT). Previously (steps 16 and 17), the present method computed the baseline correlation coefficient ($r_1$) by correlating the N baseline data points of duration with the N baseline data points of the metric of interest, and the baseline+outlier correlation coefficient ($r_2$) by correlating the (N+M) data points of duration and the (N+M) data points of the performance metric of interest.

Now, the question arises, what would the value of $r_2$ be if the M data points were just baseline data instead of outlier data? Let this correlation coefficient be labeled $r_{2\_Batesian}$. The test is to determine whether the difference $r_2-r_1$ (i.e., $r_{pm}$) is simply due to normal fluctuations of baseline data. To answer this question, at step 19 the present method computes a statistically significant number of $r_{2\_Bayesian}$ values (which will depend on the sample size, but typically may be on the order of 100 or so) and then determines the natural fluctuation of this value (e.g., as measured by the standard deviation) and compares the result to $r_{pm}$. If these natural fluctuations are comparable to $r_{pm}$ (e.g., if $r_{pm}<SD(R_{2\_Bayesian})$), then the conclusion is that the $r_{pm}$ value is simply normal fluctuation of the baseline data and that value and its associated performance metric are excluded from further consideration.

To calculate the $r_{2\_Bayesian}$ values, use the N baseline data points as a pool and select M random data points therefrom. This draw is not exclusionary. That is, if data point 39 was selected on one draw, the probability of drawing data point 39 on the next draw should be the same as it was for the previous draw.

Now, the newly selected M data points from the pool are added to the N baseline data points to produce a new Bayesian data set. The correlation coefficient between duration and the performance metric of interest for this Bayesian data set is then calculated to give a first $r_{2\_Bayesian}$ value, and this process is repeated until a statistically significant number of $r_{2\_Bayesian}$ correlation coefficients have been accumulated (e.g., approximately 100 times).

At step 20, the present method compares the standard deviation of the newly computed Bayesian correlation coefficients (which may be called "sigma" ($\sigma$) to the previously computed $r_{pm}$ for the performance metric under test. If the value of $r_{pm}$ is greater than the standard deviation for the Bayesian correlation coefficients ($\sigma$), then this metric and its associated $r_{pm}$ are retained for further consideration (step 21). Otherwise, the metric and its associated $r_{pm}$ are excluded from further consideration (step 22).

The above procedure is repeated (step 14) until values $r_{pm}$ for all performance metrics of interest have been computed. Then, at step 23, for all those performance metrics that have not been excluded from further consideration, a determination is made as to which $r_{pm}$ value is the largest. The performance metric associated with the largest $r_{pm}$ value is then identified as the most probable root cause of the anomalous duration outliers (step 24).

Several alternative procedures for the present invention exist. For example, because calculating all of the Bayesian correlation coefficients is computationally burdensome, one alternative is to omit this step during the calculation of each metric's associated $r_{pm}$. Then, using all $r_{pm}$ values, the largest is found and this metric is identified as the probable root cause of the congestion. The hypothesis is tested by computing, for this metric only, the Bayesian correlation coefficients and testing the selected $r_{pm}$ against the standard deviation of these Bayesian correlation coefficients. Also, with this approach or with the approach described with respect to FIG. 1, one may use a root means square deviation instead of the standard deviation of the Bayesian correlation coefficients as the test parameter.

Figure 2A:
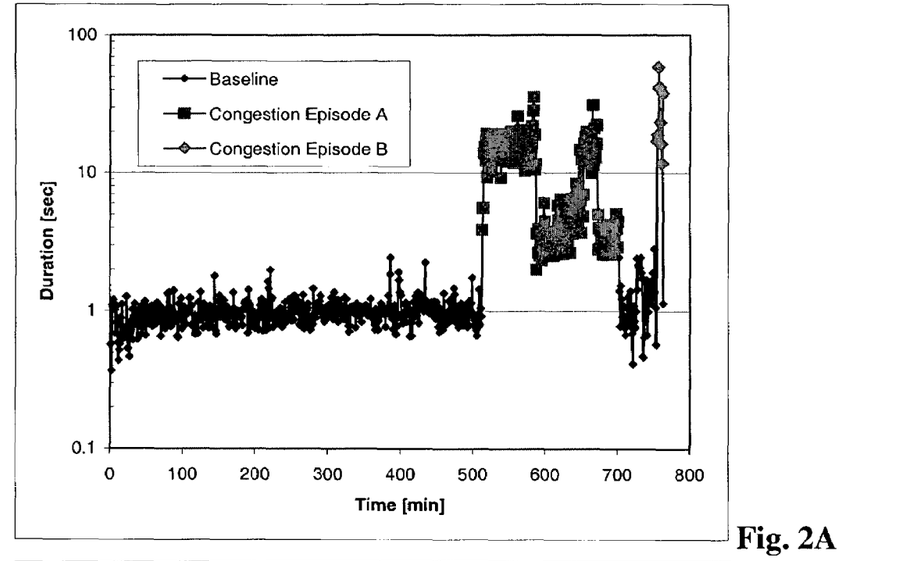
FIGS. 2A-2E illustrate an example of Internet traffic data collected for a variety of performance metrics over a time interval and show how the present methods may be used to determine which of the different performance metrics is the probable cause of duration outliers in the network traffic data.

In order to demonstrate the effectiveness of the present methods, consider FIGS. 2A-2E, which illustrate an example of Internet traffic data collected for a variety of performance metrics over a time interval and show how the present methods may be used to determine which of the different performance metrics is the probable cause of duration outliers in the network traffic data. More specifically, FIG. 2A is a plot of Internet traffic duration data collected over a time interval of approximately 750 min. By examining this plot, one can discern a long period with no significant duration outliers (the baseline data at the left of the plot), followed by two separate congestion episodes (Congestion Episode A and Congestion Episode B) that are characterized by a large number of duration outliers. Recall that duration outliers are taken to be indications of congestion in the network. The question then is which performance metric is most likely responsible for these congestion episodes.

Figure 2B:
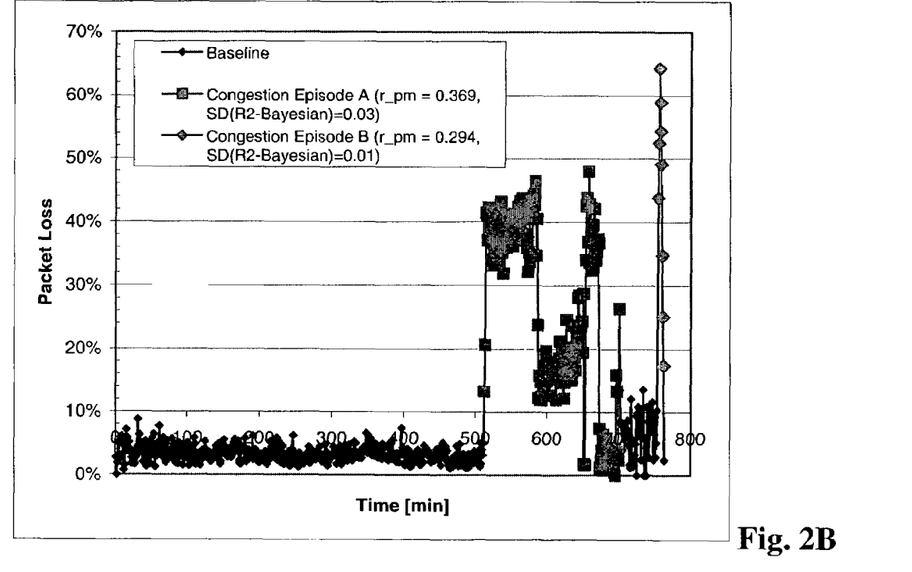
Figure 2C:
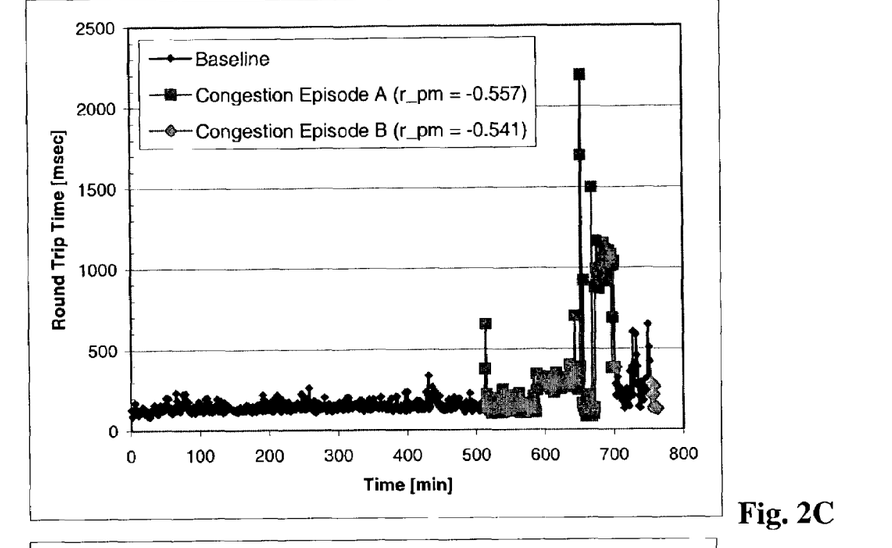
Figure 2D:
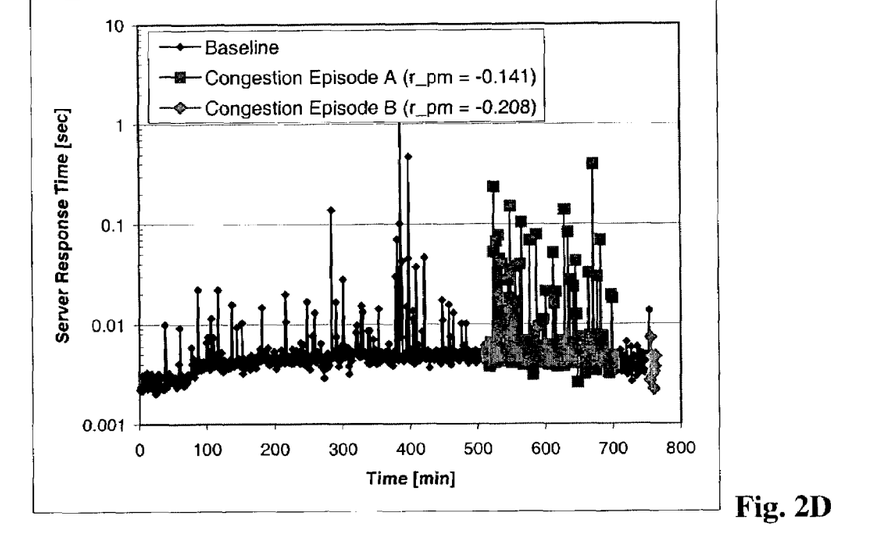
Figure 2E:
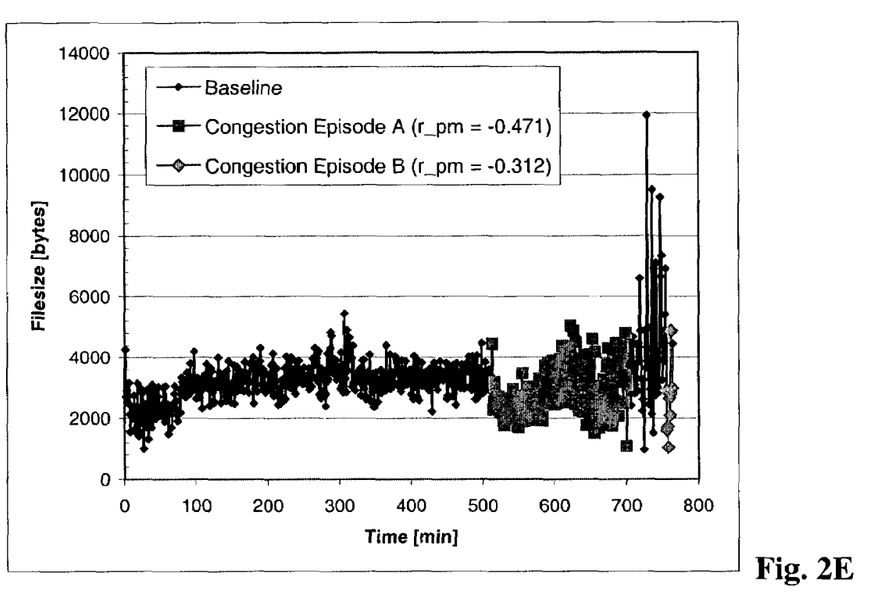

FIG. 2B illustrates a plot of Internet traffic packet loss data collected over the same time interval. That is, this plot is the packet loss information associated with the same Internet traffic for which duration information is shown in FIG. 2A. Similarly, FIG. 2C is a plot of round trip times for this same Internet traffic, FIG. 2D is a plot of server response time for this Internet traffic and FIG. 2E is a plot of file size for the same Internet traffic.

Applying the methods of the present invention, $r_{pm}$ values for data included in each of the congestion episodes for each performance metric were determined. The corresponding Bayesian statistical property (in this case standard deviation) was calculated for each metric and the result for the packet loss data is shown in the legend for the plot shown in FIG. 2B. Notice that in this case, $r_{pm}$ for the packet loss data is much larger, in each instance (congestion episode A and congestion episode B) than the corresponding Bayesian value. This indicates a very low probability that the $r_{pm}$ value is due simply to normal statistical fluctuations and we conclude, therefore, that packet loss is the metric most probably associated with the congestion episodes.

Thus, a method for correlating congestion episodes to performance metrics in Internet traffic has been described. However, although the above description included examples of presently preferred techniques, it should be remembered that the true scope of the invention should only be measured in terms of the claims, which now follow.

What is claimed is:

1. A method for determining a probable root cause of congestion within a network, comprising:
   collecting data representing a network performance metric;
   computing for the collected data an associated value $r_{pm}$ that represents a difference between a first correlation coefficient $r_1$ computed for a baseline set of the collected data and a second correlation coefficient $r_2$ computed for a second set of the collected data that includes the baseline set and other data points classified as duration outliers, the first and second correlation coefficients representing correlations between the network performance metric and durations of network connections;
   generating a value representing statistical significance of the value $r_{pm}$ by comparing $r_{pm}$ to a statistical property of a set of Bayesian correlation coefficients computed using the baseline set of the collected data;
   eliminating the network performance metric from further consideration if the value $r_{pm}$ is less than the statistical property of the set of Bayesian correlation coefficients, or otherwise retaining the network performance metric for further consideration;
   repeating the computing and eliminating or retaining processes for other network performance metrics to develop a set of retained network performance metrics and associated $r_{pm}$ values for each retained network performance metric; and
   determining the probable root cause of congestion within the network based on selecting that retained network performance metric that has a largest associated $r_{pm}$ value of all $r_{pm}$ values associated with the retained network performance metrics, wherein the largest $r_{pm}$ value indicates congestion based on anomalous deviations in the durations of network connections.

2. The method of claim 1, wherein the statistical property of the set of Bayesian correlation coefficients comprises at least one of standard deviation or root mean square deviation.

3. The method of claim 2 wherein the Bayesian correlation coefficients are each computed by selecting M random data points from the baseline set of data collected for an associated performance metric, M being equal to the difference between the number of data points in the second set of data and the baseline set of data for the associated performance metric, adding the selected M random data points to those data points in the baseline set of data to produce a Bayesian data set for the associated performance metric, and computing a correlation coefficient for the associated performance metric and duration using that Bayesian data set.

4. The method of claim 1 wherein the network performance metric comprises one of round trip time, server response time, packet loss or file size.

5. The method of claim 1 wherein the duration outliers are classified using one or more of Grubb's Test, Rosner's Test and Walsh's Test.

6. The method of claim 1 wherein the duration outliers are classified using information from the network performance metric.

7. A method for finding a cause of congestion within a network, the method comprising:
   computing performance metrics for a network;
   evaluating correlation coefficients, for each of the performance metrics, between the performance metric and connection duration within the network; and
   determining a probable cause of congestion within the network based on selecting that network performance metric having a highest difference between an outlier correlation coefficient and a baseline coefficient which indicates congestion based on anomalous deviations in the durations of network connections.

8. The method of claim 7 wherein the performance metrics are chosen from the list comprising round trip time, file size, server response time, and packet loss.

9. The method of claim 7 wherein the difference ($r_{pm}$) between an outlier correlation coefficient and a baseline correlation coefficient for a particular performance metric is available for selection only if that $r_{pm}$ compares favorably to a statistical property of a set of Bayesian correlation coefficients computed for the associated performance metric and connection duration.

10. The method of claim 9 wherein each of the Bayesian correlation coefficients is computed by selecting M random data points from a data pool used to compute the baseline correlation coefficient for the associated performance metric, M being equal to the difference between the number of data points used in computing the outlier correlation coefficient for the associated performance metric and the baseline correlation coefficient for the associated performance metric, adding the selected M random data points to those data points in the data pool to produce a Bayesian data set for the associated performance metric, and computing a correlation coefficient for the associated performance metric and duration using that Bayesian data set.

11. The method of claim 9 wherein the statistical property of the set of Bayesian correlation coefficients comprises one of standard deviation or root mean square deviation.

12. The method of claim 11 wherein to compare favorably that $r_{pm}$ must be greater than the statistical property of the set of Bayesian correlation coefficients.

* * * * *